(No Model.)

H. CLARK.
CASTER.

No. 329,275. Patented Oct. 27, 1885.

Witnesses:
Frank Sereno.
Geo. W. Hess.

Inventor:
Henry Clark.
By his Atty's.
Rowe + Page

UNITED STATES PATENT OFFICE.

HENRY CLARK, OF MILWAUKEE, WISCONSIN, ASSIGNOR OF ONE-HALF TO
FRANK W. ERBACHER, OF SAME PLACE.

CASTER.

SPECIFICATION forming part of Letters Patent No. 329,275, dated October 27, 1885.

Application filed July 27, 1885. Serial No. 172,830. (No model.)

*To all whom it may concern:*

Be it known that I, HENRY CLARK, of Milwaukee, in the county of Milwaukee and State of Wisconsin, have invented a certain Improvement in Ball-Bearing Trunk and Furniture Casters, of which the following is a specification.

My invention relates to casters for trunks and furniture, wherein a series of balls are arranged within a shell or casing, to serve as a means for providing anti-friction bearings around the spindle of a caster-roller, so as to relieve said spindle of undue friction and permit the caster to swing freely and adapt itself to the varying positions required in moving or shifting about the article supported upon the caster; to which said ends my invention consists in matters hereinafter described, and particularly pointed out in the claims.

Figure 1:
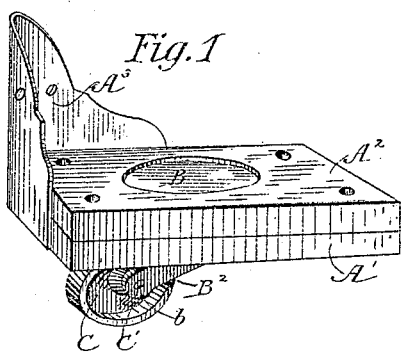
Figure 2:
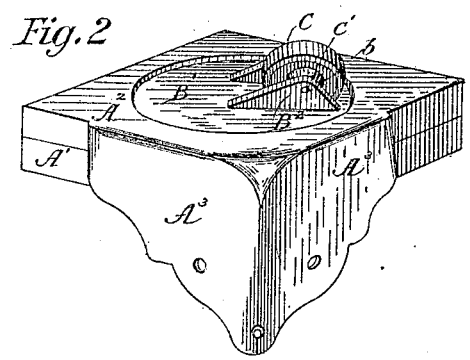
Figure 3:
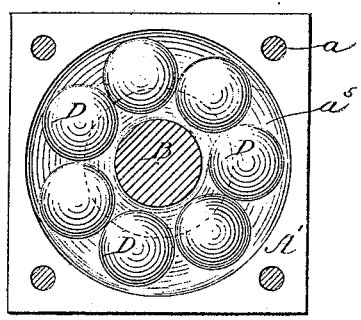
Figure 4:
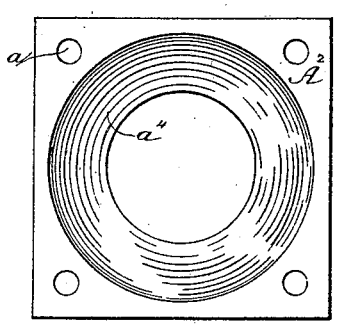
Figure 5:
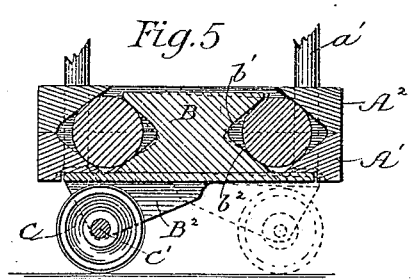
Figure 6:
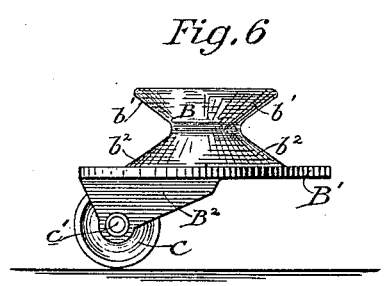
Figure 7:
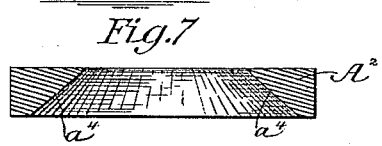
Figure 8:

Figure 1 is a perspective view of my improved caster fitted together, ready to be applied to a trunk; Fig. 2, a similar view of the same inverted. Fig. 3 represents a section taken on a horizontal plane through the spool or spindle, and the screws or rivets employed to secure the two parts of the casing together, the lower half or base-plate portion of the casing and the balls being shown in plan view; Fig. 4, an inverted face view of the cap-plate; Fig. 5, a transverse central sectional view of the improved caster, with the spool and caster-wheel shown by full lines in one position, and by dotted lines in a second position; Fig. 6, a view in elevation of the spool and caster-wheel detached; and Figs. 7 and 8, sectional details, respectively, of the cap-plate and base-plate, constituting the shell or casing.

The shell or casing A is formed of two separable plates, A' A², preferably cast of malleable iron, of corresponding outline, and of substantially equal thickness to fit or match one upon the other, and provided with corresponding screw-holes, $a$, at the four corners of the plates, to receive wood-screws or rivets $a'$, which pass through them and into or through the bottom of the trunk or article of furniture, so as to hold the plates securely thereto and to retain them accurately in register with each other. The base-plate A' and the cap-plate A² are each recessed or apertured, and each chamfered or beveled along its recess or aperture, so as to provide the plates with flat conical bearing-surfaces $a^4$ $a^5$, respectively, which said beveled or inclined bearing-surfaces meet at a slightly acute angle one with the other to form an annular V-shaped groove or wall for the central opening of the shell or casing. The spool or spindle B is similarly formed with a slightly acute-angled V-shaped groove around its periphery, the sides $b'$ $b^2$ of said grooves being arranged opposite to and substantially parallel with the respectively opposed sides $a^5$ and $a^4$ of the groove in the shell or casing, the spool, by reason of its said annular V-groove, being in effect oppositely or double coned, so as to resemble two truncated cones united at their smaller ends. When the spool and shell are arranged one within the other, an annular channel of diamond-shaped or trapezoidal cross-section is formed, within which is arranged a series of friction-balls, D, against which the conical face $a^4$ of the cap-plate and the lower conical face, $b^2$, of the spool B bear tangentially, and thus present the smallest practicable bearing-surface to a rolling and continuously-changing spherical body, by which means the frictional contact is reduced to a minimum. The spool B has a limited extent of tilt or vibratory play within the concentrically-arranged annular line of balls, and will thus adjust itself to any inequalities of the bearing-surfaces upon which the roller may be moved, and also permit, for example, the upper conical face, $b'$, of the spool and the lower conical face, $a^5$, of the base-plate to bear upon the friction-balls, and thus alternate or shift the contact-surfaces from one to the other, and present at all times a directly-opposed rolling surface to weights or strains coming from various directions. The slightly acute form of the grooves in the casing and spool will prevent the balls from becoming jammed or tightly wedged between the surfaces, and thus secure at all times a free and unobstructed movement of the balls within the grooves. The base-plate A' is preferably recessed to receive a disk, B', secured to the bottom of the spool, and ears B², arranged parallel with each other, are cast upon the under side of the disk B', to extend from the center to the rim thereof, and are provided with bearings $b$ for the axle $c'$ of the caster-wheel C. The axle $c'$ is arranged immediately beneath and tangentially to the central line of rotation of the friction-balls, and by this means a direct bearing upon the axle and the line of rotation is provided, which will admit of the rotation of the caster-supporting spindle or spool with the least possible exertion, as the rolling and bearing surfaces always maintain the same relation one to the other. The disk B' provides an extended base to steady the spool B and limit its axial oscillation or movement by pressure against the under side of the base-plate A' when excessive strain is brought upon the caster. The base-plate A' is formed with upwardly-projecting corner-plates A³, which extend from its outer-sides to form a corner brace and bumper for trunks, and for partially securing the two sections of the shell together, and screw-holes $a$, formed in said corner-plates, provide additional means for securing the caster to the trunk or article to be supported thereon.

The parts may all be cast and put together without drilling, boring, or fitting, and the cap and base plates of the shell may be separated to any required distance from each other by placing thin liners of paper between them in a well-known manner, to admit of the free movement of the balls within their channels, should they bind at any time because of tight fitting or warping of the plates.

I claim as my invention and desire to secure by Letters Patent—

1. An improved caster, consisting of a casing formed of separable sections, secured to each other and adapted to be secured to the trunk or other article of furniture, each section being formed with chamfered adjacent inner sides, a caster-wheel spool or spindle formed with oppositely-coned faces, and anti-friction balls supported between the chamfered sides of the casing and the coned faces of the spool, substantially as and for the purpose described.

2. The combination of the caster-supporting spool B, the balls D, and the casing A, formed of separable sections, one of which is provided with flanges A³, to overlap the corners of the article to which it is attached, substantially as described.

3. The combination of the cap-plate A', provided with a central opening, having the beveled edge $a^4$, the base-plate A², provided with a central opening, having the beveled edge $a^5$, the balls D, a spool, B, arranged to bear against the inner surfaces of the balls, and provided with a disk secured to its under side to bear against the cap-plate, lugs secured to the disk, and a caster journaled to said lugs, substantially as and for the purpose described.

4. The combination of the casing formed with channels upon its inner side, friction-balls arranged within said channel, and a caster-supporting spool adapted to bear upon the inner side of said balls, and arranged to move freely and change its axial position to adjust itself to the inequalities of the bearing-surfaces, substantially as described.

HENRY CLARK.

Witnesses:
WM. H. ROWE,
CHAS. G. PAGE.